Dec. 5, 1961  S. BOWMAN  3,011,356
SPROCKET CHAIN
Filed April 1, 1959
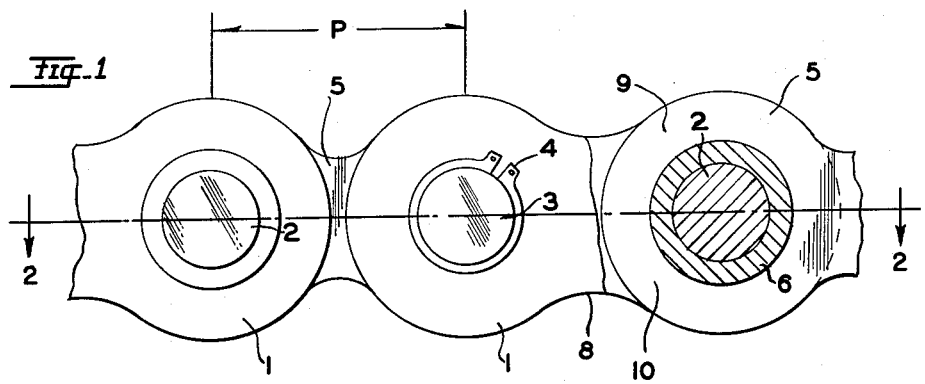
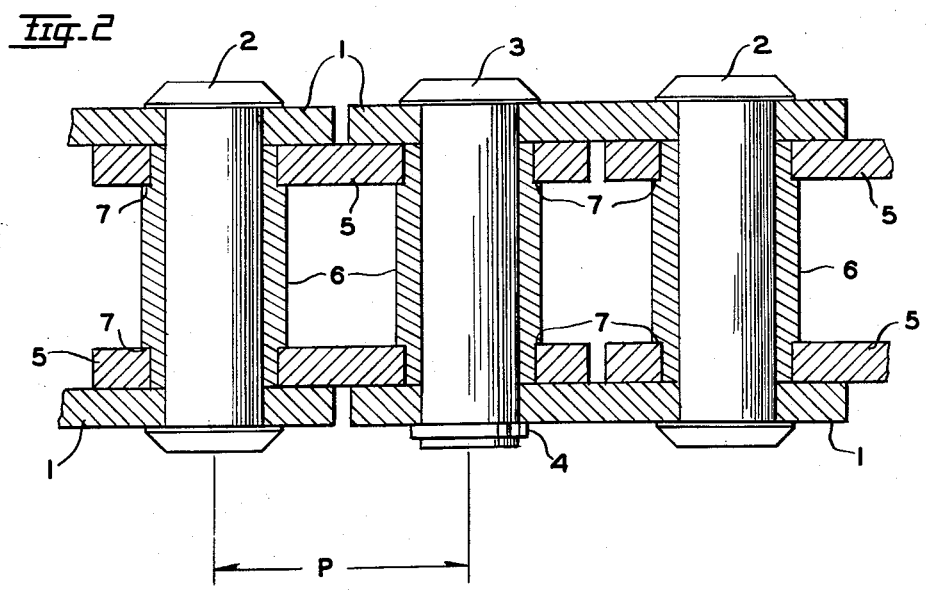
INVENTOR.
SPENCER BOWMAN
BY
Oberlin, Maky, & Donnelly
ATTORNEYS United States Patent Office 3,011,356
Patented Dec. 5, 1961

3,011,356
SPROCKET CHAIN
Spencer Bowman, Lakewood, Ohio, assignor to The Thew Shovel Company, Lorain, Ohio, a corporation of Ohio
Filed Apr. 1, 1959, Ser. No. 803,414
5 Claims. (Cl. 74—245)

The present invention relates generally as indicated to a sprocket chain and more particularly to improvements in a rollerless sprocket chain characterized in that bushings are inserted between the side links to take the place of the bushings and rollers employed in roller chains.

As is well-known in the art, chains and sprockets are used on a great many different classes of machinery for transmitting power of comparatively great magnitude and at high speeds. The basic concept in the roller chain art has remained essentially unchanged during the past fifty years or longer and it has been known that a so-called bushing chain (a chain resembling the roller chain except that the bushings between the side links are not provided with rollers) may be employed in instances where considerable power is to be transmitted but where the speed is relatively low. However, such bushing chain has never been thought of as a satisfactory substitute for the roller chain in high speed and heavy duty applications.

Upon careful investigation of the wearing characteristics of roller chains, I have discovered that the rollers thereof turn only slightly on their bushings and then less than 20% of the running time as the chain passes around the sprockets. In many purportedly worn-out chains which have rollers that are loose on their bushings, it has been found that the roller looseness is due solely to the expansion of the rollers as occasioned by the impact to which they are subjected as they pass around the sprockets. In that connection, the weights of the loose rollers is exactly the same as the weight of the rollers of a new unused chain. I have also discovered that about 65% of the users' complaints of roller chains have to do with pin failures, this apparently being due to the great deflection of the pins under load to an extent of 8% or more of their lengths. The rest of such complaints have to do with outside link failures and to small extent (1%) with failures of other parts of roller chains.

With the foregoing in mind, I have developed a rollerless sprocket chain suitable for the transmission of high power at high speed.

It is accordingly one main object of this invention to provide a rollerless sprocket chain which greatly surpasses the performance of a roller chain insofar as ultimate strength, dynamic strength (running capacity), and fatigue strength (ability to resist jerks or shock loads) are concerned while yet the cost of the rollerless chain is about the same as that of the roller chain.

More specifically, it is an object of this invention to provide a rollerless sprocket chain that will withstand a static breaking load considerably greater (70%, for example) than the breaking load of a comparable roller chain whether the latter be provided with carburized pins or with through-hardened pins.

It is another object of this invention to provide a rollerless sprocket chain in which the strains or deflections of the side links under load have been balanced or evenly distributed to result in greatly increased dynamic loading characteristics.

It is another object of this invention to provide a rollerless sprocket chain which has a greatly increased fatigue life which has exceeded thirty times that of the maximum fatigue life attained with conventional roller chain under dynamic loads.

It is another object of this invention to provide a rollerless chain which, by reason of its superior performance characteristics aforesaid, is applicable to both high speed and high power transmission.

It is another object of this invention to provide a rollerless sprocket chain which has no discernible effect on the wear of the sprocket as compared with the wear of a sprocket caused by a roller chain.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a side elevation view of a rollerless sprocket chain embodying the present invention; and FIG. 2 is a cross-section view taken substantially along the line 2—2, FIG. 1.

Referring now more specifically to the drawing, the rollerless sprocket chain herein comprises parallel outside links 1 of generally figure 8 shape with rounded ends including pitch holes therethrough through which the hardened (carburized or through-hardened) pins 2 extend in force-fitted relation, all of the pins 2, except the connecting pin 3, being provided with heads at both ends. The connecting pin 3 has a head at one end and a peripheral groove at the other end for a snap ring 4 or like retaining means.

Between the outside links 1 are similar figure 8 inside links 5 with rounded ends being formed with holes therethrough in which the reduced diameter ends of bushings 6 are force-fitted with the shoulders 7 thereof in firm engagement with the inside faces of said links 5 and with the end faces of the bushings 6 flush with the outside faces of said links 5 thereby constituting spacer means to maintain the outside links in parallel spaced apart relation.

In order to achieve the desired ends of this invention it has been discovered that for a chain of pitch P the following approximate relationships should be adhered to:

| | |
|---|---|
| Diameter of pins 2 and 3 | .36P |
| Bushing 6 outside diameter | .56P |
| Bushing 6 diameter at ends | .48P |
| Outside and inside link thickness | .16P |
| Outside and inside link width at pitch holes | .94P |
| Inside link width at neck | .46P |
| Outside link width at neck | .58P |
| Outside and inside link radius at rounded ends | .47P |

A rollerless sprocket chain made in accordance with the above-listed proportions has a breaking load of nearly 70% greater than the corresponding A.S.A. (American Standard Association) roller chain. Insofar as fatigue strength is concerned, the instant rollerless sprocket chain has a maximum life which is about thirty times the maximum life obtained with the corresponding A.S.A. roller chain.

With reference to the neck 8 formed by concavely curved surfaces tangent to the rounded ends of each side link 1, this has been made somewhat more than one-half the maximum width of the link, namely, .58P for the neck width and .94P for the maximum width, whereas each side link 5 has a neck width formed by concavely curved surfaces tangent to the rounded ends of about .46P. It has been found that such proportioning of the neck widths with respect to each other, to the maximum link widths at the pitch holes, to the diameter of pin 2, and to the diameter of bushing 6 at its ends results in a balancing or even distribution of the strains on the links 1 and 5 under heavy loads, whereby failure occurs at a much heavier load and invariably there is a separation at two zones of the inside links 5 as denoted by the reference numerals 9 and 10.

Another characterizing feature of this invention is that despite the greatly improved results, the cost of the instant rollerless sprocket chain is approximately the same as the cost of the comparable A.S.A. roller chain and the omission of the rollers of the latter has, in no discernible way, increased sprocket wear.

Following is a table of A.S.A. Standard Series roller chains:

| Chain No. | Pitch (in.) | Pin Dia. (in.) | Link Thickness (in.) | Inside Link Width (in.) |
|---|---|---|---|---|
| 35 | 3/8 | 0.141 | 0.050 | 0.344 |
| 40 | 1/2 | 0.156 | 0.060 | 0.452 |
| 50 | 5/8 | 0.200 | 0.080 | 0.594 |
| 60 | 3/4 | 0.234 | 0.094 | 0.679 |
| 80 | 1 | 0.312 | 0.125 | 0.903 |
| 100 | 1 1/4 | 0.375 | 0.156 | 1.128 |
| 120 | 1 1/2 | 0.437 | 0.187 | 1.354 |
| 140 | 1 3/4 | 0.500 | 0.219 | 1.647 |
| 160 | 2 | 0.562 | 0.250 | 1.900 |
| 200 | 2 1/2 | 0.781 | 0.312 | 2.275 |
| 240 | 3 | 0.937 | 0.375 | |

By way of table comparison, take for example, the A.S.A. 160 roller chain which has a pitch of 2″, it will be seen that my chain made in accordance with the formulae previously given (for use with the same sprocket as is used with the A.S.A. 160 chain), will have a bushing 6 width between the inside links 5 of 1¼″ and a bushing 6 diameter of 1.125″. However, the pin diameter will be .724″ as compared with .562″ and the side links 1 and 5 will have a thickness of .3125″ and a width of 1.875″, rather than .250″ and 1.900″ respectively. While the A.S.A. 160 roller chain has a published tensile strength of 58,000 lbs. it has been found that the actual tensile strength is somewhat less. In any event, using substantially the same steels and heat treatments as are used for the A.S.A. 160 roller chain, the present rollerless chain has a tensile strength of about 94,000 lbs. Likewise, with reference to dynamic loads, the rollerless chain made in accordance with the present invention, has a dynamic strength or running capacity which is considerably greater than that of the A.S.A. 160 roller chain. Specifically, the rollerless chain herein of 2″ pitch may be safely operated well over 1,000 feet per minute, whereas, the A.S.A. 160 roller chain is recommended for a maximum speed of from 250 to 300 feet per minute. Most spectacular is the great increase in fatigue life where, for example, an A.S.A. roller chain has an average fatigue life of 100,000 cycles, the comparable rollerless chain herein under the same loading conditions has a fatigue life of more than 3,000,000 cycles.

All in all, I have provided a unique rollerless sprocket chain which produces several novel and unexpected results by following a predetermined pattern of enlargement of the A.S.A. Standard chain while eliminating the roller thereof and producing a chain which has vastly superior operating and fatigue-resisting characteristics at about the same cost as the A.S.A. Standard roller chain. Accordingly, where load and speed requirements would now dictate the use of a certain size of A.S.A. roller chain, it is possible to meet the load and speed requirements with a much smaller rollerless chain made in accordance with the present invention, or conversely, the rollerless chain of comparable size to the A.S.A. roller chain may be used for much greater loads and speeds. In either event, considerable economies are effected and there is no problem of enlargement of the bushing 6 by impact as there is with the thin roller of a roller chain.

Other modes of applying the principle of the invention may be employed, change being made as regards the details described, provided the features stated in any of the following claims, or the equivalent of such, be employed.

I therefore particularly point out and distinctly claim as my invention:

1. In a heavy-duty, high-speed, built-up block, or bushing type sprocket chain of given pitch P, the combination of a series of transversely disposed pins of approximately 0.36P uniform diameter throughout, pairs of outside links of approximately 0.16P thickness having transverse holes wherein the ends of successive pairs of said pins are non-rotatively secured, a cylindrical bushing rotatably mounted on each of said pins between said outside links, said bushings each having a main portion of approximately 0.56P diameter to engage the teeth of a sprocket of such given pitch and end portions of approximately 0.48P diameter adjacent said outside links, and pairs of inside links of approximately 0.16P thickness, alternating with said pairs of outside links, having transverse holes wherein such ends of said bushings are non-rotatably secured.

2. The combination of claim 1 wherein said outside links are of generally figure-8 shape with rounded ends of about .47P radius struck from the axes of such holes and with intermediate neck portions of about .58P width formed by concavely curved surfaces that are tangent to the .47P radii of such rounded ends.

3. The combination of claim 1 wherein said inside links are of generally figure-8 shaped with rounded ends of about .47P radius struck from the axes of such holes and with intermediate neck portions of about .46P width formed by concavely curved surfaces that are tangent to the .47P radii of such rounded ends.

4. The combination of claim 1 wherein said inside and outside links are of generally figure-8 shape with rounded ends of about .47P radius struck from the axes of such holes and with intermediate neck portions respectively of about .46P and .58P width formed by concavely curved surfaces that are tangent to the .47P radii of such rounded ends.

5. The combination set forth in claim 1 wherein said inside and outside links have necked center portions such that the respective transverse sectional areas through the centers of both said links will be substantially the same as the transverse sectional areas through the respective holes.

References Cited in the file of this patent

UNITED STATES PATENTS

| | | |
|---|---|---|
| 1,877,339 | Kottlowski | Sept. 13, 1932 |
| 1,994,840 | Thoen | Mar. 19, 1935 |
| 2,182,443 | McAninch | Dec. 5, 1939 |
| 2,329,303 | Stewart | Sept. 14, 1943 |

FOREIGN PATENTS

| | | |
|---|---|---|
| 286,918 | Switzerland | Mar. 2, 1953 |